(12) United States Patent
Kim et al.

(10) Patent No.: US 11,560,223 B2
(45) Date of Patent: Jan. 24, 2023

(54) FLIGHT VEHICLE

(71) Applicant: SEOUL NATIONAL UNIVERSITY R&DB FOUNDATION, Seoul (KR)

(72) Inventors: Hyoun Jin Kim, Seoul (KR); Seung Jae Lee, Gunsan-si (KR)

(73) Assignee: Seoul National University R&DB Foundation, Seoul (KR)

( * ) Notice: Subject to any disclaimer, the term of this patent is extended or adjusted under 35 U.S.C. 154(b) by 387 days.

(21) Appl. No.: 16/760,276

(22) PCT Filed: Dec. 11, 2018

(86) PCT No.: PCT/KR2018/015715
§ 371 (c)(1),
(2) Date: Apr. 29, 2020

(87) PCT Pub. No.: WO2019/117602
PCT Pub. Date: Jun. 20, 2019

(65) Prior Publication Data
US 2020/0324889 A1    Oct. 15, 2020

(30) Foreign Application Priority Data
Dec. 15, 2017    (KR) .................. 10-2017-0173277
Dec. 11, 2018    (KR) .................. 10-2018-0159014

(51) Int. Cl.
*B64C 27/52*    (2006.01)
*B64C 27/41*    (2006.01)
(Continued)

(52) U.S. Cl.
CPC .............. *B64C 27/52* (2013.01); *B64C 27/41* (2013.01); *B64C 39/024* (2013.01); *F16C 11/04* (2013.01);
(Continued)

(58) Field of Classification Search
CPC .................... B64C 27/52; B64C 2201/027
See application file for complete search history.

(56) References Cited

U.S. PATENT DOCUMENTS 3,176,774 A * 4/1965 Krinsky .................. B64C 27/52
416/162
6,598,827 B2 * 7/2003 Kusic ...................... B64C 27/52
244/17.11
(Continued)

FOREIGN PATENT DOCUMENTS

KR    2017-0137793 A    12/2017
WO    99-38769 A1    8/1999
(Continued)

OTHER PUBLICATIONS

International Search Report and Written Opinion dated Mar. 14, 20199 in International Patent Application No. PCT/KR2018/015715, filed Dec. 11, 2018, 11 pages.

*Primary Examiner* — Philip J Bonzell
(74) *Attorney, Agent, or Firm* — Kilpatrick Townsend & Stockton LLP

(57) ABSTRACT

Provided is a flight vehicle and in particular a flight vehicle in which a main module equipped with a device capable of carrying cargo, photographing, etc. may freely switch directions during flight while applying a posture independent of a thrust module because the thrust module is configured to freely perform roll and pitch motions with respect to the main module.

5 Claims, 13 Drawing Sheets

(51) Int. Cl.
*B64C 39/02* (2006.01)
*F16C 11/04* (2006.01)
*F16C 11/06* (2006.01)
*F16H 21/16* (2006.01)

(52) U.S. Cl.
CPC .............. *F16C 11/06* (2013.01); *F16H 21/16* (2013.01); *B64C 2201/027* (2013.01)

(56) References Cited

U.S. PATENT DOCUMENTS

| | | | | |
|---|---|---|---|---|
| 7,150,429 B2 * | 12/2006 | Kusic | .................. | B64C 29/0033 244/17.23 |
| 7,306,186 B2 * | 12/2007 | Kusic | .................. | B64C 29/0033 244/17.23 |
| 7,438,260 B2 * | 10/2008 | Kusic | ..................... | B64C 27/12 244/17.11 |
| 7,753,310 B2 * | 7/2010 | Kusic | ..................... | B64C 27/28 244/12.4 |
| 7,992,820 B2 * | 8/2011 | Kusic | .................. | B64C 29/0033 244/17.19 |
| 8,042,762 B2 * | 10/2011 | Kusic | ..................... | B64C 27/52 244/17.21 |
| 8,091,825 B2 * | 1/2012 | Kusic | .................. | B64C 29/0075 244/56 |
| 8,196,854 B2 * | 6/2012 | Kusic | ..................... | B64D 1/22 244/17.11 |
| 10,814,965 B2 * | 10/2020 | Suzuki | ..................... | B64C 27/08 |
| 10,858,092 B2 * | 12/2020 | Nam | ..................... | B64C 27/08 |
| 11,325,696 B2 * | 5/2022 | Suzuki | ..................... | B64C 39/024 |
| 2002/0100835 A1 * | 8/2002 | Kusic | ..................... | B64C 27/08 244/17.23 |
| 2003/0029965 A1 * | 2/2003 | Kusic | ..................... | B64D 1/22 244/17.11 |
| 2004/0144891 A1 * | 7/2004 | Kusic | ..................... | B64C 27/52 244/17.11 |
| 2005/0230520 A1 * | 10/2005 | Kusic | .................. | B64C 29/0075 244/12.4 |
| 2005/0269440 A1 * | 12/2005 | Kusic | ..................... | B64C 27/12 244/17.11 |
| 2006/0157616 A1 * | 7/2006 | Kusic | ..................... | B64C 27/28 244/17.23 |
| 2006/0231676 A1 * | 10/2006 | Kusic | ..................... | B64C 27/12 244/17.11 |
| 2007/0034735 A1 * | 2/2007 | Kusic | .................. | B64C 29/0075 244/17.23 |
| 2007/0102569 A1 * | 5/2007 | Kusic | ..................... | B64C 27/52 244/17.11 |
| 2007/0114324 A1 * | 5/2007 | Kusic | ..................... | B64C 27/12 244/17.11 |
| 2010/0044497 A1 * | 2/2010 | Kusic | ..................... | B64D 1/22 244/17.19 |
| 2010/0078523 A1 * | 4/2010 | Kusic | ..................... | B64C 27/52 244/23 A |
| 2010/0171000 A1 * | 7/2010 | Kusic | ..................... | B64C 27/28 244/23 A |
| 2010/0264255 A1 * | 10/2010 | Kusic | ..................... | B64C 27/12 244/17.19 |
| 2011/0210212 A1 * | 9/2011 | Kusic | ..................... | B64C 27/12 244/23 A |
| 2012/0312917 A1 * | 12/2012 | Kusic | ..................... | B64C 27/12 244/17.25 |
| 2017/0015412 A1 | 1/2017 | Matus | | |
| 2017/0217571 A1 | 8/2017 | Deng et al. | | |
| 2017/0274981 A1 | 9/2017 | Shiosaki et al. | | |
| 2018/0141647 A1 * | 5/2018 | Suzuki | ..................... | B64C 39/024 |
| 2018/0312246 A1 * | 11/2018 | Nam | ..................... | B64C 27/52 |
| 2021/0039775 A1 * | 2/2021 | Suzuki | ..................... | B64C 39/024 |
| 2021/0229801 A1 * | 7/2021 | Nam | ..................... | B64D 27/26 |
| 2021/0291971 A1 * | 9/2021 | Bernard | ................ | B64C 27/605 |

FOREIGN PATENT DOCUMENTS

| | | | | |
|---|---|---|---|---|
| WO | WO-0134466 A1 * | 5/2001 | ............. | A63H 27/12 |
| WO | WO-2017183637 A1 * | 10/2017 | ............. | B64C 39/02 |

* cited by examiner (a)  (b)

FLIGHT VEHICLE

TECHNICAL FIELD

The present disclosure relates to a flight vehicle, and more particularly to, a flight vehicle in which a main module equipped with a device capable of carrying cargo, photographing, etc. may freely switch directions during the flight while applying a posture independent of a thrust module because the thrust module is configured to freely perform roll and pitch motions with respect to the main module.

BACKGROUND ART

A small flight vehicle, also called a drone, has recently been actively developed and used in a wide range of fields owing to the development of lightweight materials, the development of small thrust devices, and the development of flight algorithms.

However, when the flight vehicle switches postures in the air, because the flight vehicle is not normally supported by the ground as it is on the ground, a posture is usually inclined. That is, as shown in (a) of FIG. 1, when the altitude simply rises, there is no problem because the posture is maintained by simply ascending as shown by arrow A, whereas, when the flight vehicle switches directions during flight, as shown by arrow B of (b), the flight vehicle needs to be inclined in order to generate thrust in a horizontal direction. As described above, the flight vehicle, which switches directions, undergoes a great inconvenience in a process of performing photographing and transportation. For example, in the case of a photographing flight vehicle that photographs the ground, when the entire flight vehicle is inclined to switch flight directions, a photographing field of view may be greatly out of a photographing target point. In this case, a continuous photographing of the photographing target point becomes difficult, or a rapid direction switch becomes difficult. In another example, in the case of a transport flight vehicle, when the entire flight vehicle is inclined to switch flight directions during flight, an accident may occur that a transport object may be inclined and damaged, spilled, or deformed.

Therefore, there is a need for the development of a flight vehicle that may freely switch flight directions while not affecting the performance of a mission.

DESCRIPTION OF EMBODIMENTS

Technical Problem

Provided is a flight vehicle in which a main module equipped with a device capable of carrying cargo, photographing, etc. may have a posture independent of a thrust module and freely switch directions during flight because the thrust module is configured to freely perform roll and pitch motions with respect to the main module.

Solution to Problem

According to an aspect of the present disclosure, a flight vehicle includes a thrust module configured to generate thrust for flight of the flight vehicle; a main module located below the thrust module; and a joint module configured to connect the thrust module to the main module up and down, wherein the joint module is configured to connect the thrust module to the main module in order to enable the thrust module to relatively perform a roll motion and a pitch motion with respect to the main module such that the thrust module enables to perform the roll motion and the pitch motion independently from a posture of the main module.

Preferably, the joint module includes an upper joint member pivotable with respect to a first pivoting shaft extending in a horizontal direction; a lower joint member pivotable with respect to a second pivoting shaft orthogonal to the first pivoting shaft and extending in the horizontal direction; and a connection block disposed between the upper joint member and the lower joint member and to which the first pivoting shaft and the second pivoting shaft are connected.

Preferably, the upper joint member and the lower joint member are arranged in series in an up and down direction.

Preferably, the joint module includes a universal joint.

Preferably, the flight vehicle further includes a link module configured to connect the thrust module to the main module, wherein the link module is configured to vary a distance between one side of the thrust module and the main module to enable the thrust module to relatively perform a roll motion and a pitch motion.

Preferably, the thrust module includes one or more arms extending in a horizontal direction and the link module includes a rod unit configured to connect between one side of the arm and the main module, and a driving unit fixed to the main module and configured to vary a height of the rod unit in an up and down direction.

Preferably, the link module further includes a link unit configured to connect between the rod unit and the driving unit, wherein one end of the link unit is pivotally connected to the driving part, and the other end is pivotally connected to the rod unit, and, according to an operation of the drive unit, the link unit pivots to move the rod unit up and down.

Preferably, the one or more arms include a first arm and a second arm intersecting perpendicularly to each other, the link module includes a first link module and a second link module, and the first link module pivots the first arm with respect to the first pivoting shaft, and the second link module pivots the second arm with respect to the second pivoting shaft.

Preferably, an end of the rod unit and the one or more arms are connected by a rod-end having a ball joint.

According to another aspect of the present disclosure, a flight vehicle includes a thrust module configured to generate thrust for flight of the flight vehicle; a main module located below the thrust module; a joint module configured to connect the thrust module to the main module up and down in a vertical direction and including a roll axis and a pitch axis; and a link module, wherein the joint module includes a lower joint member connected to the main module; and an upper joint member disposed on the lower joint member and having an upper end connected to the thrust module, the upper joint member being connected to the lower joint member to perform a roll motion and a pitch motion with respect to the roll axis and the pitch axis such that the thrust module enables to perform the roll motion and the pitch motion with respect to the roll axis and the pitch axis independently from a posture of the main module, and wherein the link module is configured to vary a distance between a part of the thrust module and a part of the main module to enable the thrust module to perform the roll motion and the pitch motion with respect to the roll axis and the pitch axis.

Preferably, the link module includes a first variable link module and a second variable link module, wherein the first variable link module is configured to vary the distance between the part of the thrust module and the part of the main module to enable the thrust module to pivot with respect to the pitch axis, and wherein the second variable link module is configured to vary the distance between the part of the thrust module and the part of the main module to enable the thrust module to pivot with respect to the roll axis, wherein the first variable link module includes a ball joint disposed on the roll axis, and wherein the second variable link module includes a ball joint disposed on the pitch axis, such that the first variable link module and the second variable link module are connected to the main module or the thrust module via the ball joints and the pitch motion of the thrust module by the first variable link module and the roll motion of the thrust module by the second variable link module are performed independently from each other.

Preferably, the thrust module includes a first arm and a second arm extending to intersect with a predetermined angle to each other, and wherein the link module includes a first variable link module and a second variable link module, wherein the first variable link module is configured to vary a distance between a part of the first arm and a part of the main module to enable the thrust module to pivot with respect to the pitch axis, and wherein the second variable link module is configured to vary a distance between a part of the second arm and a part of the main module to enable the thrust module to pivot with respect to the roll axis.

Preferably, the first arm and the second arm are configured to be orthogonal to each other, and wherein any one of the first arm and the second arm extends in parallel to any one of the roll axis and the pitch axis.

Preferably, the flight vehicle further includes a first connection member connected to the main module, wherein one end of the first variable link module is connected to the first connection member, and wherein a position at which the first variable link module and the first connection member are connected is on the roll axis.

Preferably, the first variable link module and the first connection member are connected by a ball joint.

Preferably, the first variable link module includes a first actuator; and a first link unit having a length or an angle varying by the first actuator.

Preferably, the first link unit is located in a first virtual plane and has the length or the angle varying in the first virtual plane, and wherein the first virtual plane includes the roll axis and has a direction parallel to the pitch axis as a normal vector.

Preferably, the first actuator is disposed on the first arm.

Preferably, the first actuator has a first space portion in at least a part of a portion overlapping with the first virtual plane such that the first link unit is located on the first virtual plane and the first link unit is displaced or deformed in the first virtual plane.

Preferably, the flight vehicle further includes a second connection member connected to the second arm, wherein one end of the second variable link module is connected to the second connection member, and wherein a position at which the second variable link module and the second connection member are connected is on the pitch axis.

Preferably, the second variable link module and the second connection member are connected by a ball joint.

Preferably, the second variable link module includes a second actuator; and a second link unit having a length or an angle varying by the second actuator.

Preferably, the second link unit is located in a second virtual plane and has the length or the angle varying in the second virtual plane, and wherein the second virtual plane includes the pitch axis and has a direction parallel to an extension direction of the first arm as a normal vector.

Preferably, the second actuator is connected to the main module.

Preferably, the main module has a second space portion in at least a part of a portion overlapping with the second virtual plane such that the second link unit is located on the second virtual plane and the second link unit is displaced or deformed in the second virtual plane.

Preferably, the upper joint member and the lower joint member are arranged in series in a vertical direction.

Preferably, the joint module includes a universal joint.

Advantageous Effects of Disclosure

According to a flight vehicle of the present disclosure, a main module equipped with a device capable of carrying cargo, photographing, etc. may have a posture independent of a thrust module and freely switch directions during flight because the thrust module is configured to freely perform roll and pitch motions with respect to the main module.

In addition, according to the flight vehicle of the present disclosure, because the roll motion and the pitch motion of the thrust module may be independently performed without affecting each other, a posture control may be easily performed.

BEST MODE

Figure 1:
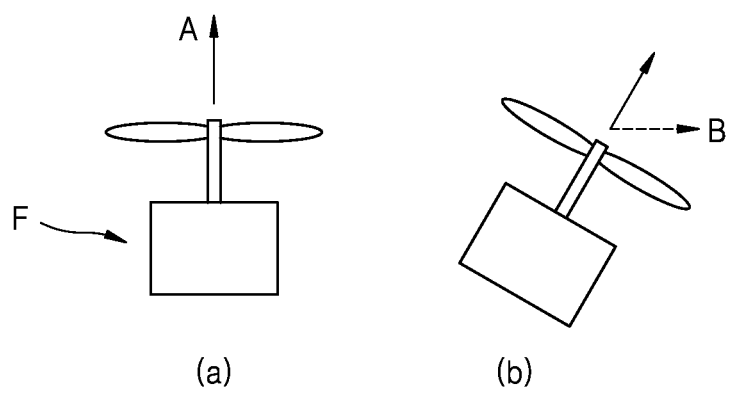
FIG. 1 is a view showing a structure of a small flight vehicle according to the related art.
Figure 2:
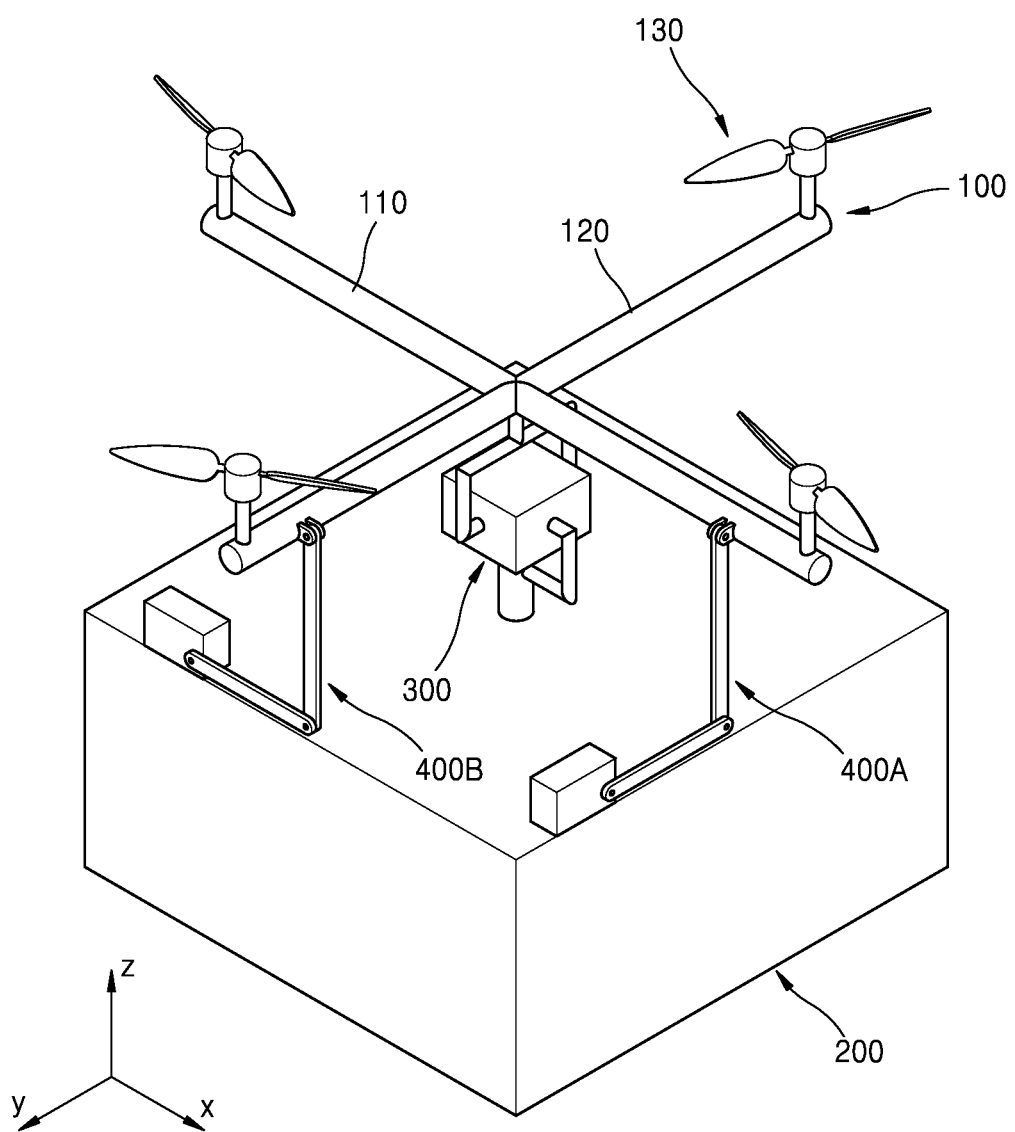
FIG. 2 is a view showing an overall structure of a flight vehicle according to a first embodiment of the present disclosure.
Figure 3:
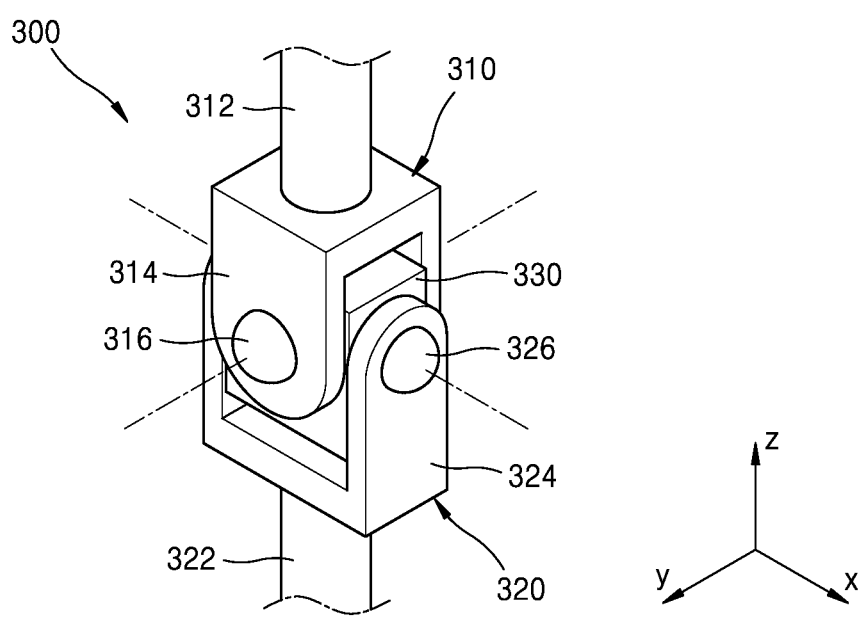
FIG. 3 is a view showing a structure of a joint module of the flight vehicle according to the first embodiment of the present disclosure.

The present disclosure relates to a flight vehicle, and more particularly to, a flight vehicle in which a main module equipped with a device capable of carrying cargo, photographing, etc. may freely switch directions during flight while applying a posture independent of a thrust module because the thrust module is configured to freely perform roll and pitch motions with respect to the main module.

Mode of Disclosure

Hereinafter, embodiments of the present disclosure will be described with reference to the accompanying drawings. The embodiment is not intended to be limited.

A flight vehicle according to a first embodiment of the present disclosure may include a thrust module 100, a main module 200, a joint module 300, and a link module 400.

The thrust module 100 is a module for generating thrust for the flight of the flight vehicle. The thrust module 100 may include a plurality of arms having a predetermined angle to each other and extending in a horizontal direction, and thrust devices 130 provided on the arms.

Preferably, each of the arms may include a first arm 110 and a second arm 120 extending with a predetermined length on one horizontal plane and cross orthogonal to each other at right angles in the longitudinal center portion. At this time, the first arm 110 may extend in the x-axis direction, and the second arm 120 may extend in the y-axis direction.

The thrust device 130 is a device for substantially generating thrust, and may include a propeller and a predetermined driving device for rotating the propeller. Preferably, the thrust devices 130 may be disposed at each end of the first arm 110 and each end of the second arm 120 and thus a total of four thrust devices 130 may be provided. The driving device for driving the thrust device 130 may be, for example, a predetermined motor. Such a driving device may be provided in the thrust module 100 or may be provided in the main module 200 and configured to transmit power through a predetermined power connection device.

The main module 200 may be a device disposed in a lower portion of the thrust module 100 and may include various power supply units, a communication device, a photographing device, etc. In addition, the main module 200 may include a transporting device that may accommodate various cargoes, etc. inside or store the cargoes or grip and move the cargoes. The present disclosure is not limited thereto, and a separate device necessary for performing other tasks such as communication, transportation, photographing, etc. may be provided in the main module 200.

In addition, the main module 200 may have a predetermined posture control module capable of controlling a posture. As will be described later, since the main module 200 may have a posture independent of the thrust module 100, a posture control module capable of controlling the posture of the main module 200 separately from an operation and a posture of the thrust module 100 may be embedded in the main module 200 or the posture control module may be provided separately. For example, a device for changing the posture of the main module 200 such as an inclination angle, etc. by displacing the center of gravity of the main module 200, or a device for enabling the main module 200 to perform a predetermined motion may be embedded in the main module 200.

The joint module 300 is a device provided between the thrust module 100 and the main module 200 to connect the thrust module 100 and the main module 200 up and down. The joint module 300 connects the thrust module 100 to the main module 200 such that the thrust module 100 may relatively perform the roll motion and the pitch motion with respect to the main module 200.

Preferably, the joint module 300 may include an upper joint member 310, a lower joint member 320, and a connection block 330. The upper joint member 310 constitutes an upper portion of the joint module 300, the lower joint member 320 constitutes a lower portion of the joint module 300, and the connection block 330 connects the upper joint member 310 to the lower joint member 320 to each other.

The upper portion of the upper joint member 310 is connected to the thrust module 100 and the lower portion is connected to the connection block 330. In this case, preferably, an upper beam 312 extending upward and downward is provided on the upper portion of the upper joint member 310, and an upper end of the upper beam 312 is connected to a center portion at which the first arm 110 and the second arm 120 intersect with each other. The lower portion of the upper joint member 310 is provided with an upper pivoting portion 314 that may be pivotably connected to the connection block 330. The upper pivoting portion 314 is provided with a first pivoting shaft 316 penetrating the connection block 330. Therefore, the upper joint member 310 is pivotable with respect to the first pivoting shaft 316. For example, the first pivoting shaft 316 extends in the y-axis direction, such that the upper joint member 310 is pivotable with respect to the y-axis.

A lower portion of the lower joint member 320 is connected to the main module 200, and an upper portion thereof is connected to the connection block 330. At this time, preferably, a lower beam 322 connected to the central portion of the main module 200 is provided on a lower portion of the lower joint member 320. In addition, a lower pivoting portion 324 is pivotably connected to the connection block 330 on the upper portion of the lower joint member 320. In this case, the lower beam 322 may extend up and down on the same line as the upper beam 312 of the upper joint member 310. In addition, the lower pivoting portion 324 is provided with a second pivoting shaft 326 penetrating the connection block 330. Therefore, the connection block 330 is pivotable with respect to the second pivoting shaft 326. In this case, the second pivoting shaft 326 extends in the x-axis direction, such that the connection block 330 is pivotable with respect to the x-axis.

The connection block 330 connects the upper joint member 310 to the lower joint member 320. The connection block 330 may have two through holes that cross orthogonally to each other on a horizontal plane. Accordingly, one through hole may be penetrated in the x axis direction, and the other through hole may be penetrated in the y axis direction. The second pivoting shaft 326 of the lower joint member 320 may be connected to the through hole penetrated in the x axis direction, and the first pivoting shaft 316 of the upper joint member 310 may be connected to the through hole penetrated in the y axis direction. Here, although the upper joint member 310 and the lower joint member 320 have a pivoting shaft and the connection block 330 has a shape in which the pivoting shaft is inserted, the opposite is also possible. In addition, all of the upper joint member 310, the lower joint member 320, and the connection block 330 may have a hole into which a shaft in the shape of a predetermined shaft is inserted.

Accordingly, the upper joint member 310 is pivotable with respect to the x and y axes with respect to the lower joint member 320. Thus, the roll motion and the pitch motion are possible. That is, it is possible for the thrust module 100 connected onto the upper joint member 310 to perform the roll motion and the pitch motion with respect to the main module 200 connected to the lower portion of the lower joint member 320.

The joint module 300 configured as described above may be configured as a universal joint having pivotable upper and lower portions with respect to two axes orthogonal to each other.

The link module 400 may include a driving unit 410, a rod unit 430, and a link unit 420.

The driving unit 410 may be fixed to the main module 200 and may include a predetermined servo motor. The driving unit 410 may generate a rotational force such that the link unit 420 that will be described later may pivot.

The link unit 420 may be configured in the shape of a beam having a predetermined length and may extend in a horizontal direction, and have one end connected to the driving unit 410, and the other end connected to the rod unit 430. Specifically, one end of the link unit 420 is connected to the driving unit 410 through a first connection shaft 442 and is pivotable with respect to the driving unit 410. In addition, the other end of the link unit 420 is connected to the rod unit 430 through a second connection shaft 444 and is pivotable with respect to the rod unit 430.

The rod unit 430 may be configured in the shape of a beam having a predetermined length and may extend in a vertical direction. The rod unit 430 may have one end connected to the other end of the link unit 420 and the other end connected to one side of the arm of the thrust module 100. Specifically, one end of the rod unit 430 is connected to the link unit 420 through the second connection shaft 444 and is pivotable. In addition, the other end of the rod unit 430 is connected to the arm through a third connection shaft 446 and is pivotable with respect to the arm. In addition, the arm is provided with a predetermined connection means 140 to connect to the third connection shaft 446. The connection means 140 is configured such that the other end of the rod unit 430 is connected.

In this case, preferably, the other end of the rod unit 430 may be configured as a predetermined rod end. That is, the other end of the rod unit 430 may be configured as a ball joint. Accordingly, the other end of the rod unit 430 may have an end in the shape of a predetermined ball, and the connection means 140 may have a configuration in which at least a part of the end in the shape of the ball is interpolated to be pivotable therein. Therefore, when the arm is inclined, the third connection shaft 446 may have a configuration that is inclined at different angles.

At this time, according to an example, a hole formed in the other end of the rod unit 430 may have an inner diameter larger than the diameter of the third connection shaft 446 such that a clearance between holes formed in the third connection shaft 446 and other end of the rod unit 430 may be present. Therefore, when the arm is inclined, the third connection shaft 446 may be inclined at different angles in the hole.

A plurality of link modules 400 may be provided. Preferably, two link modules 400 may be provided and connected to the first arm 110 and the second arm 120, respectively.

For example, if the link module 400 connected to the first arm 110 is referred to as a first link module 400, and the link module 400 connected to the second arm 120 is referred to as a second link module 400, the first link module 400 may pivot the first arm 110 with respect to the first pivoting shaft 316. In addition, the second link module 400 may pivot the second arm 120 with respect to the second pivoting shaft 326.

Figure 4:
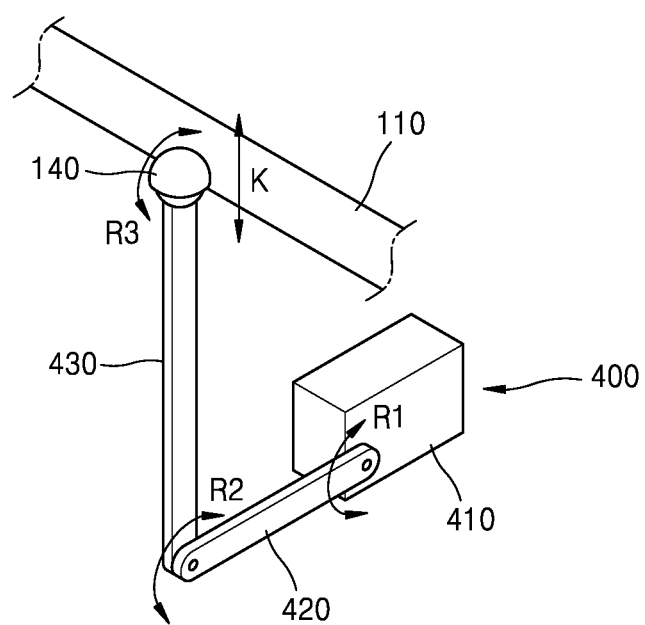
FIG. 4 is a view showing a structure of a link module of the flight vehicle according to the first embodiment of the present disclosure.

For example, referring to FIG. 4, an operation of the first arm 110 by the first link module 400 is as follows.

When the driving unit 410 operates to pivot the link unit 420 as R1, the rod unit 430 connected to the other end of the link unit 420 also relatively pivots with respect to the link unit 420 as R2. At this time, since the rod unit 430 moves up and down according to the pivoting of the link unit 420, the first arm 110 connected to the rod unit 430 is also displaced up and down as indicated by an arrow K.

For example, when the other end of the link unit 420 pivots to descend downward, the rod unit 430 moves downward. Accordingly, the first arm connected to the rod unit 430 may pivot such that the side connected to the rod unit 430 is inclined downward with respect to the first pivoting shaft 316.

Meanwhile, when the other end of the link unit 420 rises upward, the rod unit 430 moves upward. Accordingly, the first arm connected to the rod unit 430 may pivot such that the side connected to the rod unit 430 is inclined upward with respect to the first pivoting shaft 316.

As described above, the pivoting of the first arm 110 and the thrust module 100 with respect to the first pivoting shaft 316 may correspond to the roll motion.

Such an operation may be applied to an operation of the second arm 120 by the second link module 400 in the same manner. At this time, since the second arm 120 pivots with respect to the second pivoting shaft 326, the pivoting of the second arm 120 and the thrust module 100 with respect to the second pivoting shaft 326 may correspond to the pitch motion.

As described above, according to the operation of the link module 400, the thrust module 100 is able to complicatedly perform the roll motion and the pitch motion with respect to the x axis and the y axis.

In the above embodiment, the link module 400 is described as having a configuration including the drive unit 410 including the servo motor, the link unit 420, and the rod unit 430, but is not necessarily limited thereto. For example, an embodiment in which a link in the shape of a predetermined bar is provided to connect between each arm of the thrust module 100 and the main module 200 performs the roll motion and the pitch motion by varying the length of the link is also possible.

Figure 5:
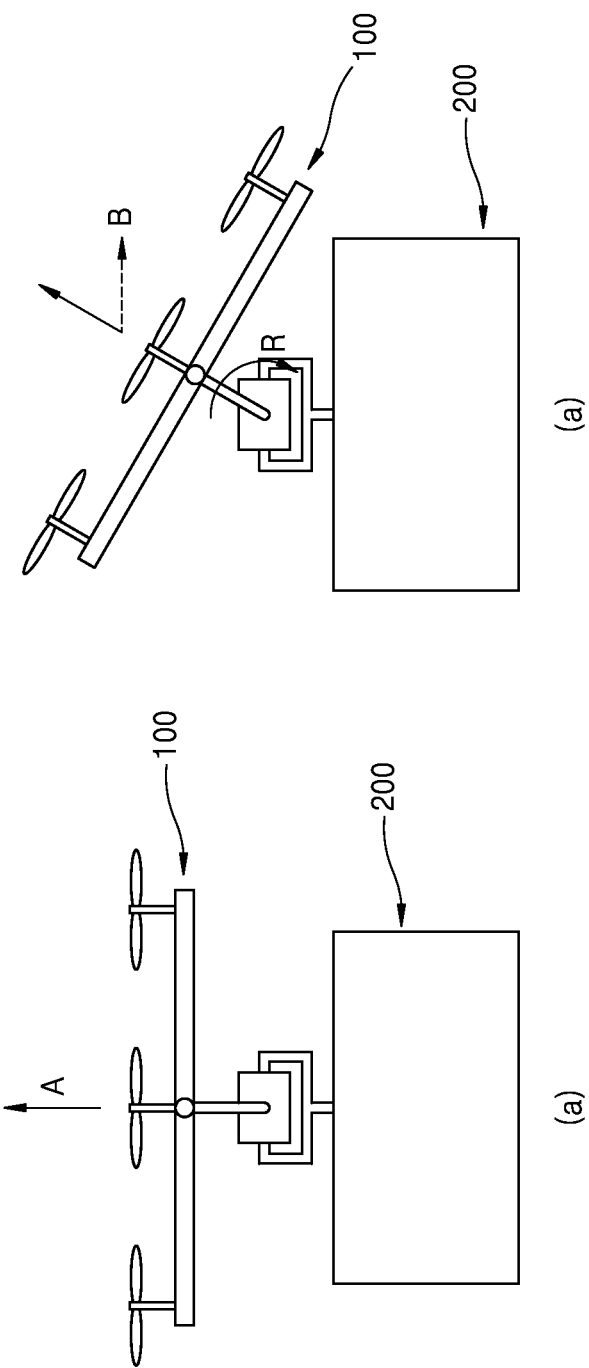
FIG. 5 is a view showing an example of a flight direction switching of the flight vehicle according to the first embodiment of the present disclosure.

According to the present disclosure, the main module 200, which is in charge of cargo transportation, photographing or various missions, may have a posture independent of the thrust module 100, and the thrust module 100 in charge of the thrust may perform the roll and pitch motions. That is, the thrust module 100 may perform the roll and pitch motions relative to the main module 200 to freely control a flight direction. For example, as shown in FIG. 5, even when switching flight directions during flight, the main module 200 may maintain a constant posture. That is, as shown in (a), when the altitude simply rises upward A, the thrust module 100 generates thrust while maintaining a proper posture. In addition, when switching directions, if the thrust module 100 is inclined as shown in (b), the thrust module 100 generates thrust in a horizontal direction as indicated by an arrow B.

When a flight device of the related art switches flight directions during flight, a posture of the entire flight device is inclined. For example, in the case of a photographing flight vehicle that photographs the ground, when the entire flight vehicle is inclined to switch flight directions, a photographing field of view may be greatly out of a photographing target point. In this case, a continuous photographing of the photographing target point becomes difficult. In another example, in the case of a transport flight vehicle, when the entire flight vehicle is inclined to switch flight directions during flight, an accident may occur that a transport object may be inclined and damaged, spilled, or deformed.

However, in the flight vehicle according to the present disclosure, since the main module 200 equipped with a device capable of carrying cargo, photographing, etc. may have a posture independent of the thrust module 100, the thrust module 100 is configured to freely perform the roll and pitch motions in a state where the main module 200 maintains a constant posture or has a specific posture. Thus, the flight vehicle may freely switch directions during flight by not preventing the main module 200 from performing a specific task.

Also, preferably, since the main module 200 may have a separate posture control module, the main module 200 may perform a task while implementing a posture separate from a thrust direction by the thrust module 100.

Hereinafter, with reference to the accompanying drawings, a flight vehicle according to a second embodiment of the present disclosure will be described. This embodiment is not intended to be limited.

Figure 6:
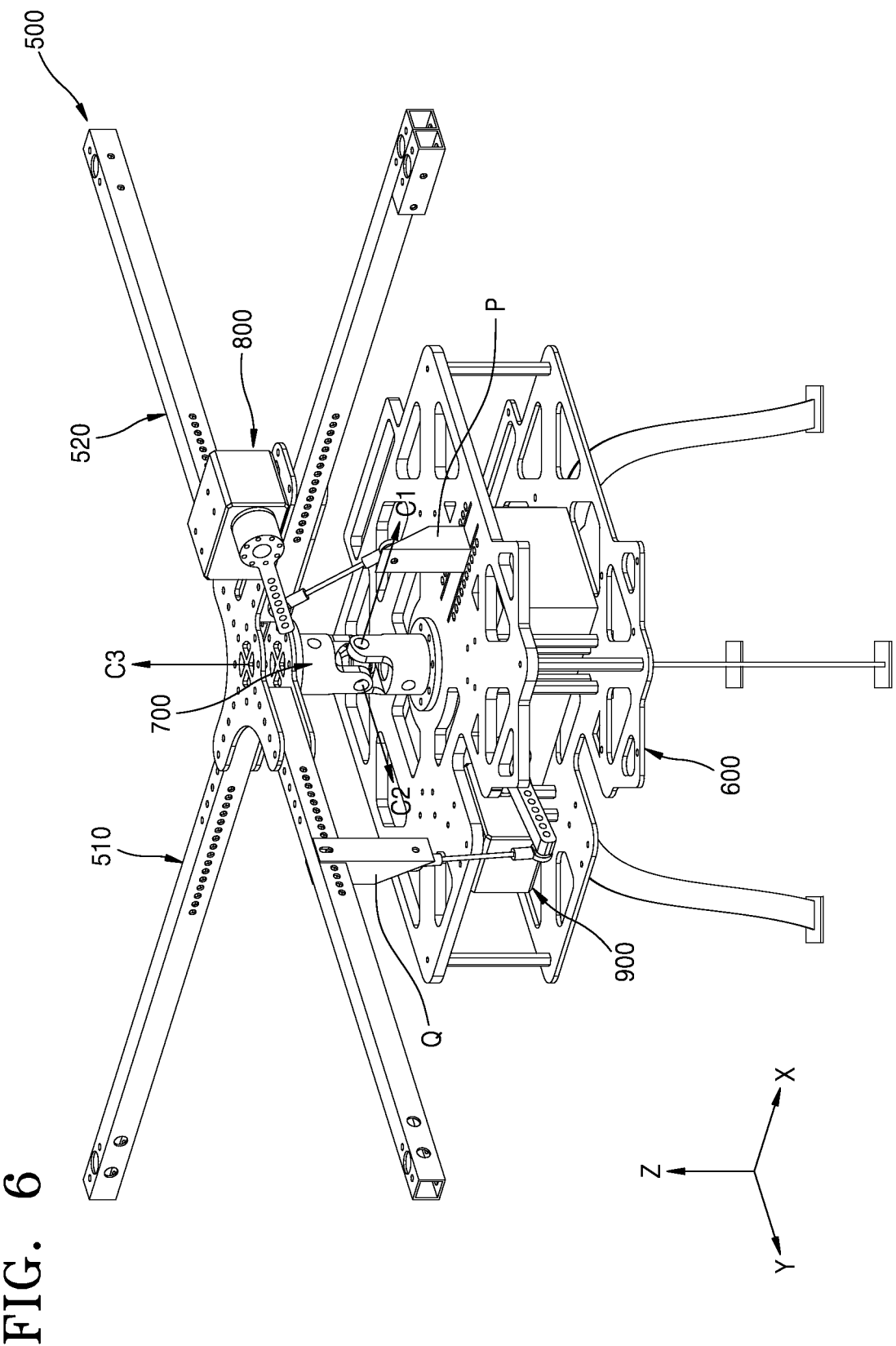
FIG. 6 is a view showing an overall structure of a flight vehicle according to a second embodiment of the present disclosure.
Figure 7:
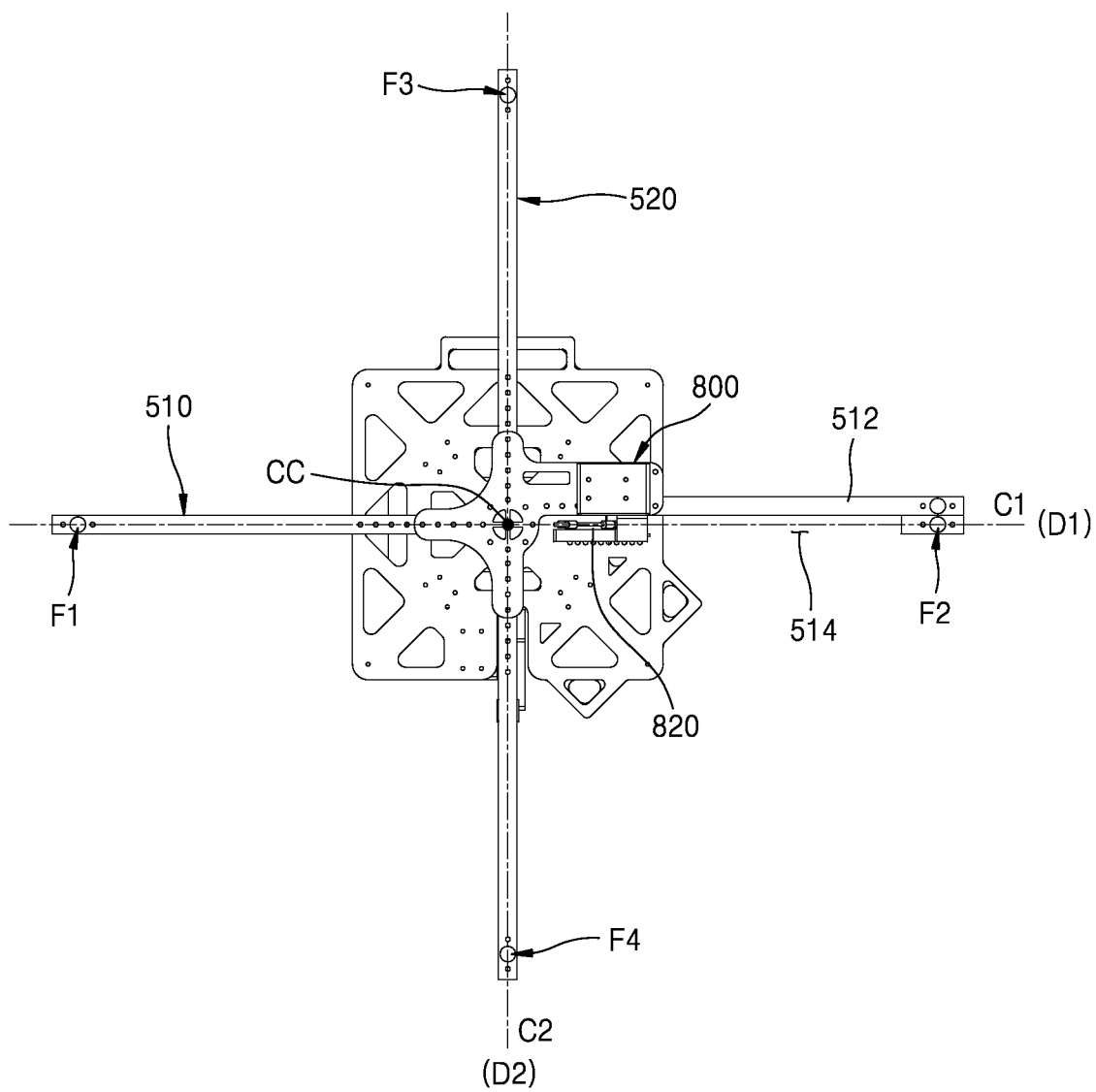
FIG. 7 is a view showing a structure of the flight vehicle according to the second embodiment of the present disclosure seen from above.
Figure 8:
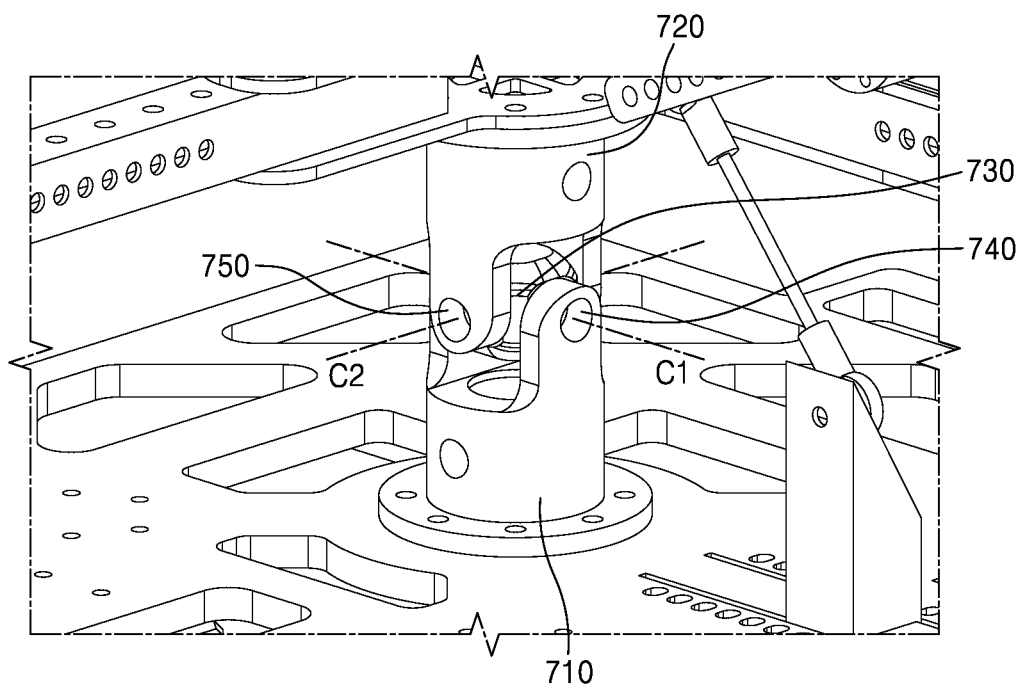
FIG. 8 is a view showing a structure of a joint module of the flight vehicle according to the second embodiment of the present disclosure.
Figure 9:
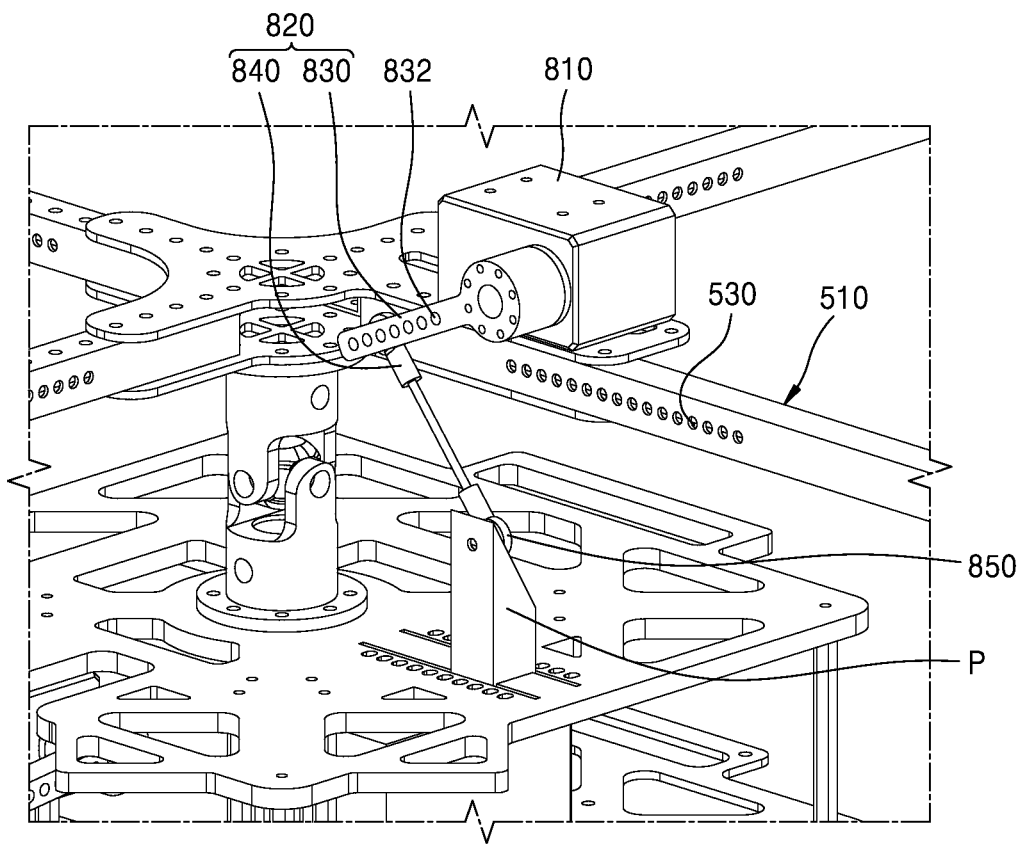
FIG. 9 is a view showing structures of a first variable link module and a first connection member of the flight vehicle according to the second embodiment of the present disclosure.
Figure 10:
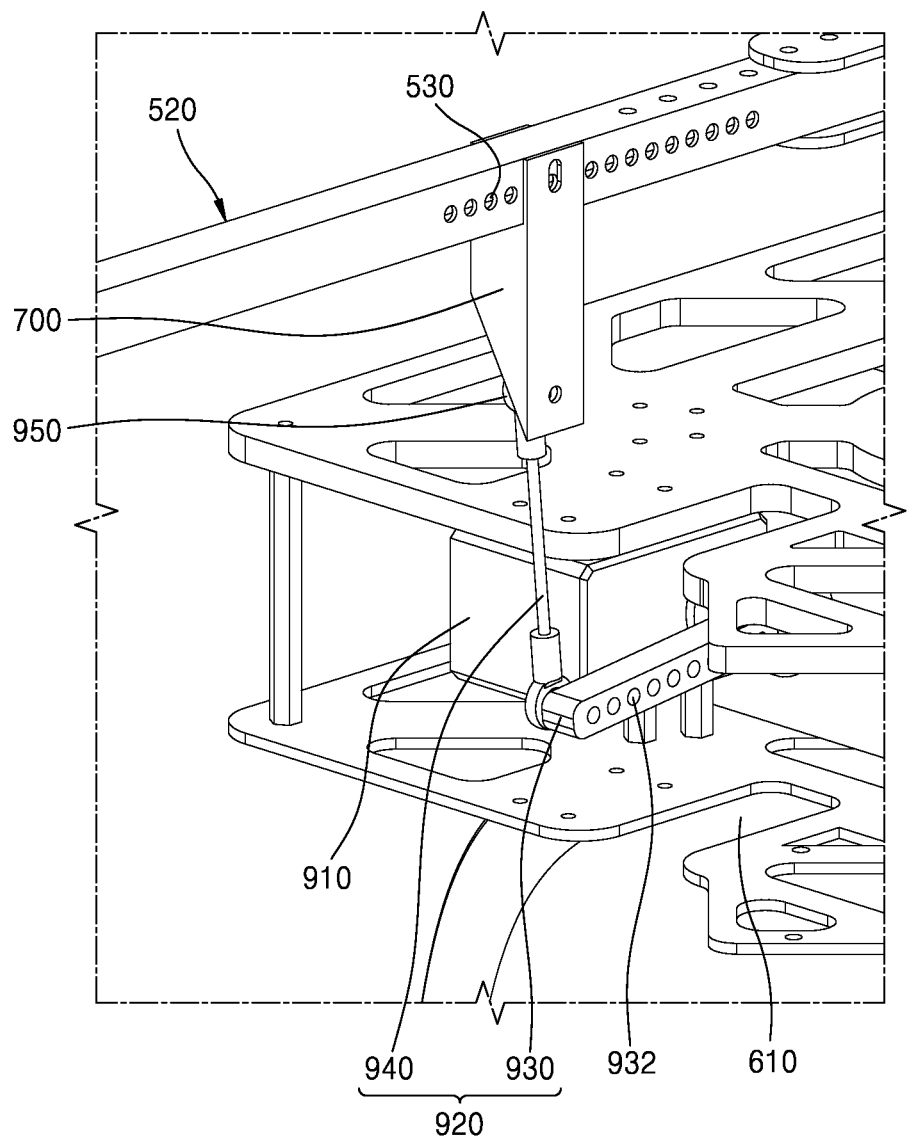
FIG. 10 is a view showing structures of a second variable link module and a second connection member of the flight vehicle according to the second embodiment of the present disclosure.

FIG. 6 is a view showing an overall structure of a flight vehicle according to a second embodiment of the present disclosure, FIG. 7 is a view showing a structure of the flight vehicle according to the second embodiment of the present disclosure seen from above, FIG. 8 is a view showing a structure of a joint module 700 of the flight vehicle according to the second embodiment of the present disclosure, FIG. 9 is a view showing structures of a first variable link module 800 and a first connection member P of the flight vehicle according to the second embodiment of the present disclosure, and FIG. 10 is a view showing structures of a second variable link module 900 and a second connection member Q of the flight vehicle according to the second embodiment of the present disclosure.

The flight vehicle according to the second embodiment of the present disclosure may include a thrust module 500, a main module 600, the joint module 700, the first and second variable link modules 800 and 900, and first and second connection members P and Q.

Hereinafter, the position, direction, and relationship of each member will be described with respect to a direction shown in FIG. 6. The x, y, and z axes shown in FIG. 6 may constitute directions parallel to a roll axis C1, a pitch axis C2, and a yaw axis C3, respectively. However, the present disclosure is not necessarily limited thereto, and the x axis may constitute a direction parallel to the pitch axis C2 and the y axis may configure a direction parallel to the roll axis C1 according to a posture and an orientation. That is, in the following description, the roll axis C1 and the pitch axis C2 are not necessarily limited concepts.

The thrust module 500 is a module for generating thrust for the flight of the flight vehicle. The thrust module 500 may include a plurality of arms having a predetermined angle to each other and extending in a horizontal direction, and thrust devices (not shown) provided on the arms.

Preferably, the arms of the thrust module 500 may include a first arm 510 and a second arm 520. At this time, the first arm 510 and the second arm 520 may be disposed on one horizontal plane, extend with a predetermined length, and cross orthogonal to each other at right angles in a longitudinal center portion CC. At this time, the second arm 520 may extend in a direction parallel to the pitch axis C2. In addition, the first arm 510 may extend in a direction orthogonal to at least a part of the second arm 520. However, the present disclosure is not necessarily limited thereto, and any one of the first arm 510 and the second arm 520 may extend in parallel to any one of the roll axis C1 and the pitch axis C2, and the other arm may have a configuration orthogonal to the arm extending in parallel to any one of the roll axis C1 and the pitch axis C2.

However, the present disclosure is not necessarily limited thereto, and the number of arms may be plural and the angle may be optional. For example, the arms may be provided in any number or more, and may have a configuration such as a quadrotor, a hexarotor, an octorotor, etc.

Preferably, the first arm 510 may have a first space portion 514 in at least a part of a portion overlapping with the roll axis C1 in a vertical direction (a yaw axis direction). For example, as shown in FIG. 7, the first arm 510 may have a side arm 512 extending at a position spaced apart from the roll axis C1.

In addition, a connection hole 530 may be formed in the first arm 510 and the second arm 520. A plurality of connection holes 530 may be formed in the length direction of the first arm 510 and the second arm 520. Therefore, a connection position of the first variable link module 800 and the second variable link module 900 that will be described later may selectively vary.

The thrust devices (not shown) may be disposed at ends F1 and F2 of the first arm 510 and ends F3 and F4 of the second arm 520 and thus a total of four thrust devices may be provided. For example, the thrust device may include a propeller and a power device for rotating the propeller. Such a power device may be provided in the thrust module 500 or may be provided in the main module 600 and configured to transmit power through a predetermined power connection device. However, the present disclosure is not limited thereto.

The main module 600 may be a device disposed in a lower portion of the thrust module 500 and may include various power supply units, a communication device, a photographing device, etc. In addition, the main module 600 may include a transporting device that may accommodate various cargoes, etc. inside or store the cargoes or grip and move the cargoes. The present disclosure is not limited thereto, and a separate device necessary for performing other tasks such as communication, transportation, photographing, etc. may be provided in the main module 600.

In addition, in FIGS. 6 to 10, the main module 600 is shown only in the lower portion of the thrust module 500, but is not necessarily limited thereto. For example, a predetermined beam extending higher than the thrust module 500 is provided on an upper portion of the main module 600, and additional devices and modules may be mounted on the beam.

In addition, the main module 600 may have a predetermined posture control module capable of controlling a posture. As will be described later, since the main module 600 may have a posture independent of the thrust module 500, a posture control module capable of controlling the posture of the main module 600 separately from an operation and a posture of the thrust module 500 may be embedded in the main module 600 or the posture control module may be provided separately. For example, a device for changing the posture of the main module 600 such as an inclination angle, etc. by displacing the center of gravity of the main module 600, or a device for enabling the main module 600 to perform a predetermined motion may be embedded in the main module 600.

The joint module 700 is a device provided between the thrust module 500 and the main module 600 to connect the thrust module 500 and the main module 600 up and down. The joint module 700 connects the thrust module 500 to the main module 600 such that the thrust module 500 may relatively perform a roll motion and a pitch motion with respect to the main module 600.

Preferably, the joint module 700 may include a lower joint member 710, an upper joint member 720, and a connection block 730. The lower joint member 710 constitutes a lower portion of the joint module 700, the upper joint member 720 constitutes an upper portion of the joint module 700, and the connection block 730 connects the lower joint member 710 and the upper joint member 720 to each other. In addition, the first connection shaft 740 connects the lower joint member 710 to the connection block 730, and the second connection shaft 750 connects the upper joint member 720 to the connection block 730.

A lower portion of the lower joint member 710 is connected to the main module 600, and the upper portion thereof is connected to the connection block 730.

The first connection shaft 740 may penetrate the upper portion of the lower joint member 710. At this time, the first connection shaft 740 is positioned on the roll axis C1 and extends in a direction of the roll axis C1. That is, the first connection shaft 740 constitutes the roll axis C1 of the thrust module 500.

An upper portion of the upper joint member 720 is connected to the thrust module 500, and the lower portion thereof is connected to the connection block 730. The second connection shaft 750 may penetrate the lower portion of the lower joint member 710. At this time, the second connection shaft 750 is positioned on the pitch axis C2 and extends in a direction of the pitch axis C2. That is, the second connection shaft 750 constitutes the pitch axis C2 of the thrust module 500.

In other words, the second connection shaft 750 may extend in a direction parallel to the second arm 520, and the first connection shaft 740 may extend in a direction orthogonal to the second connection shaft 750.

Accordingly, when viewed with respect to the lower joint member 710, the upper joint member 720 is pivotable with respect to the lower joint member 710 with respect to the roll axis C1 and the pitch axis C2. Therefore, it is possible for the thrust module 500 connected onto the upper joint member 720 to perform the roll motion and the pitch motion with respect to the main module 600 connected to the lower portion of the lower joint member 710.

However, the first connection shaft 740 is configured as the roll axis C1 and the second connection shaft 750 is configured as the pitch axis C2, but is not limited thereto. That is, on the contrary, it is also possible for the first connection shaft 740 to form the pitch axis C2 and the second connection shaft 750 to the roll axis C1.

The joint module 700 configured as described above may be configured as a universal joint having pivotable upper and lower portions with respect to two axes orthogonal to each other.

A link module includes the first variable link module 800 for varying the angle of the first arm 510 with respect to the pitch axis C2, and the second variable link module 900 for varying the angle of the second arm 520 with respect to the roll axis C1.

The first connection member P and the second connection member Q are connected to the first variable link module 800 and the second variable link module 900, respectively.

Hereinafter, configurations of the first variable link module 800 and the first connection member P and the connection structure thereof will be described. Next, configurations of the second variable link module 900 and the second connection member Q, and the connection structure thereof will be described.

First, the configurations of the first variable link module 800 and the first connection member P and the connection structure thereof will be described.

The first variable link module 800 includes a first actuator 810 and a first link unit 820.

According to an embodiment, the first actuator 810 may be disposed on the first arm 510. The arrangement position of the first actuator 810 may selectively vary. The first actuator 810 may generate a rotational motion.

According to an embodiment, the first link unit 820 may include a 1-1th link 830 and a 1-2th link 840 that are hinged to each other and have a variable angle. The 1-1th link 830 is connected to the first actuator 810 and is pivotable. The 1-2th link 840 is hingedly connected to the 1-1th link 830. The angle between the 1-1th link 830 and the 1-2th link 840 may vary by an operation of the first actuator 810. Preferably, the 1-1th link 830 may have a plurality of link holes 832 formed at different positions such that a connection position of the 1-1th link 830 and the 1-2th link 840 may selectively vary.

At this time, the first link unit 820 may be located in a first virtual plane D1, and the angle between the 1-1th link 830 and the 1-2th link 840 may vary in the first virtual plane D1. The first virtual plane D1 is a plane including the roll axis C1 and having a direction parallel to the pitch axis C2 as a normal vector. In a state where the thrust module 500 is standing upright as shown in FIGS. 6 and 7, the first virtual plane D1 overlaps with the roll axis C1 up and down, as indicated in FIG. 7. Since the orientation of the pitch axis C2 is variable (see FIG. 12), the normal vector of the first virtual plane D1 may also vary in the same manner as the orientation of the pitch axis C2.

As described above, the first arm 510 may have the first space portion 514 in the at least a part of the portion overlapping with the first virtual plane D1. In addition, the first link unit 820 may be positioned at a position overlapping with the first space portion 514 up and down. Therefore, the first link unit 820 may be located in the first virtual plane D1 and an angle may vary in the first virtual plane D1.

The first connection member P is connected to the main module 600. The first connection member P may be configured, for example, in the form of an arm that is erected to extend upward by a predetermined height on the main module 600.

The first connection member P and the first link unit 820 may be connected by a first pivoting joint 850 configured as a ball joint. Therefore, the first link unit 820 may freely rotate with respect to the first pivoting joint 850.

At this time, the position of the first pivoting joint 850 (a position at which the first connection member P and the first link unit 820 are connected to each other) may be positioned on the roll axis C1. Therefore, the first variable link module 800 may pivot with respect to the roll axis C1.

Next, the configurations of the second variable link module 900 and the second connection member Q, and the connection structure thereof will be described.

The second variable link module 900 includes a second actuator 910 and a second link unit 920.

According to an embodiment, the second actuator 910 may be disposed in the main module 600. The second actuator 910 may generate a rotation motion.

According to an embodiment, the second link unit 920 may include a 2-1th link 930 and a 2-2th link 940 that are hinged to each other and have a variable angle. The 2-1th link 930 is connected to the second actuator 910 and is pivotable, and the 2-2th link 940 is connected to the 2-1th link 930 and thus an angle may vary. Preferably, the 2-1th link 930 may have a plurality of link holes 932 formed at different positions such that a connection position of the 2-1th link 930 and the 2-2th link 940 may selectively vary.

At this time, the second link unit 920 may be located in a second virtual plane D2, and the angle may vary in the second virtual plane D2. The second virtual plane D2 is a plane including the pitch axis C2 and having an extension direction of the first arm 510 (a direction parallel to the extension direction of the first arm 510) as a normal vector. In a state where the thrust module 500 is standing upright as shown in FIGS. 6 and 7, the second virtual plane D2 overlaps with the pitch axis C2 up and down, as indicated in FIG. 7. Since an inclination angle of the first arm 510 is variable, the normal vector of the second virtual plane D2 may also vary in the same manner as the orientation and the inclination angle of the first arm 510.

As described above, the main module 600 may have the second space portion 610 in at least a part of a portion overlapping with the second virtual plane D2. In addition, the second link unit 920 may be positioned at a position overlapping with the second space portion 614 up and down. Therefore, the second link unit 920 may be located in the second virtual plane D2 and an angle may vary in the second virtual plane D2.

The second connection member Q is connected to the second arm 520. The second connection member Q may be configured, for example, in the form of an arm that is connected to the second arm 520 and extends downward by a predetermined height.

The second connection member Q and the second link unit 920 may be connected by a second pivoting joint 950 configured as a ball joint. Therefore, the second variable link module 900 may freely rotate with respect to the second pivoting joint 950.

At this time, the position of the second pivoting joint 950 (a position at which the second connection member Q and the second link unit 920 are connected to each other) may be positioned on the pitch axis C2. Therefore, the second variable link module 900 may pivot with respect to the pitch axis C2.

The first connection member P and the second connection member Q are specifically described above, but the actual embodiment of the present disclosure is not limited thereto. That is, according to the second embodiment of the present disclosure, the first variable link module 800 varies a distance between a part of the thrust module 500 and a part of the main module 600 such that the thrust module 500 pivots with respect to the pitch axis C2. At this time, the second variable link module 900 varies a distance between a part of the thrust module 500 and a part of the main module 600 such that the thrust module 500 pivots with respect to the roll axis C1. In addition, the first variable link module 800 has a ball joint located on the roll axis C1, and the second variable link module 900 has a ball joint located on the pitch axis C2. Accordingly, it may be understood that the first variable link module 800 and the second variable link module 900 are connected to the main module 600 or the thrust module 500 via the ball joint. Therefore, the flight vehicle according to the second embodiment of the present disclosure may be a flight vehicle in which a pitch motion of the thrust module 500 by the first variable link module 800, and a roll motion of the thrust module 500 by the second variable link module 900 are performed independently from each other.

Hereinafter, the posture control and operation of the flight vehicle according to the second embodiment of the present disclosure will be described.

Figure 11:
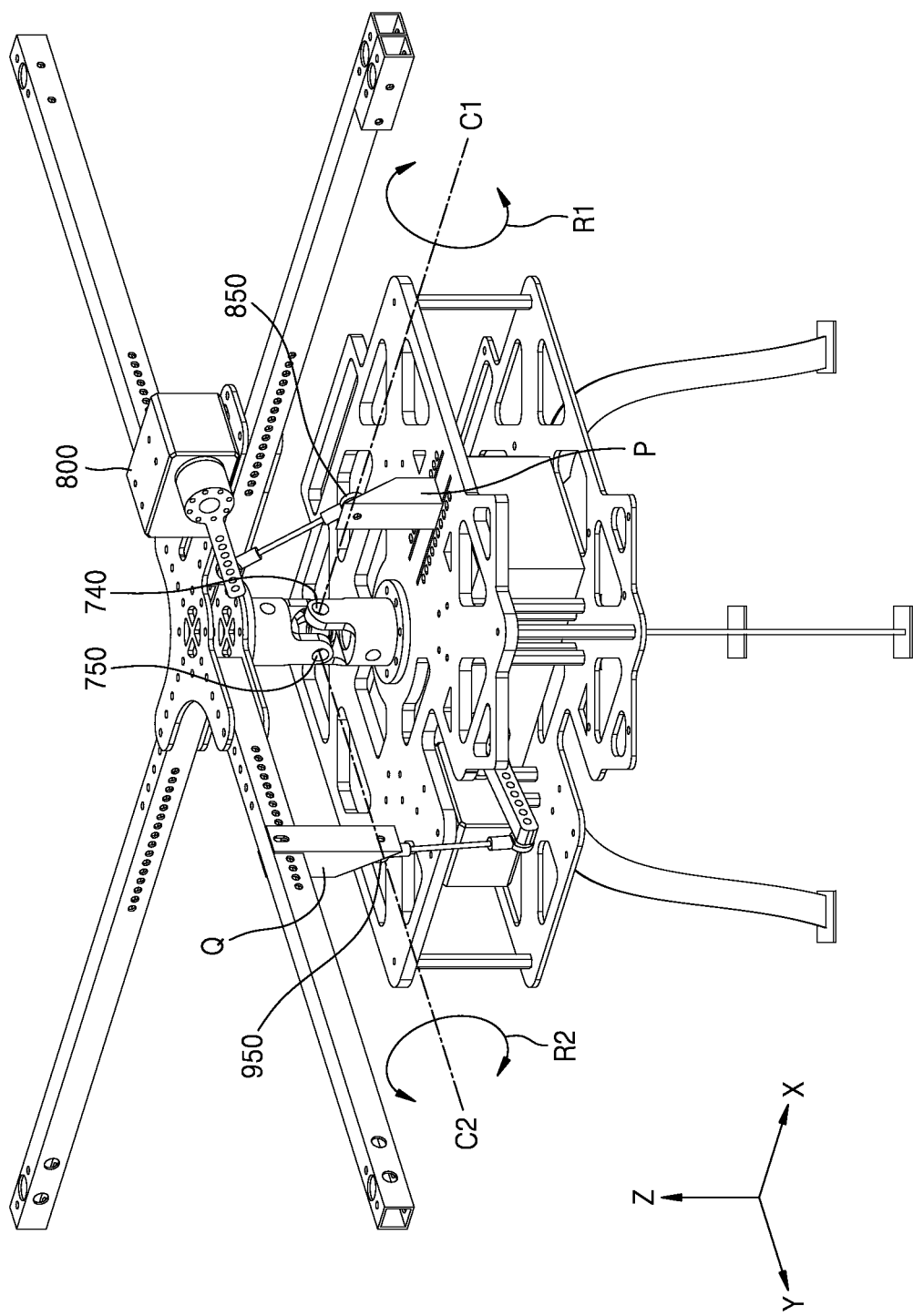
FIGS. 11 to 13 are views showing an operation and posture control of a flight vehicle according to the present disclosure.
Figure 12:
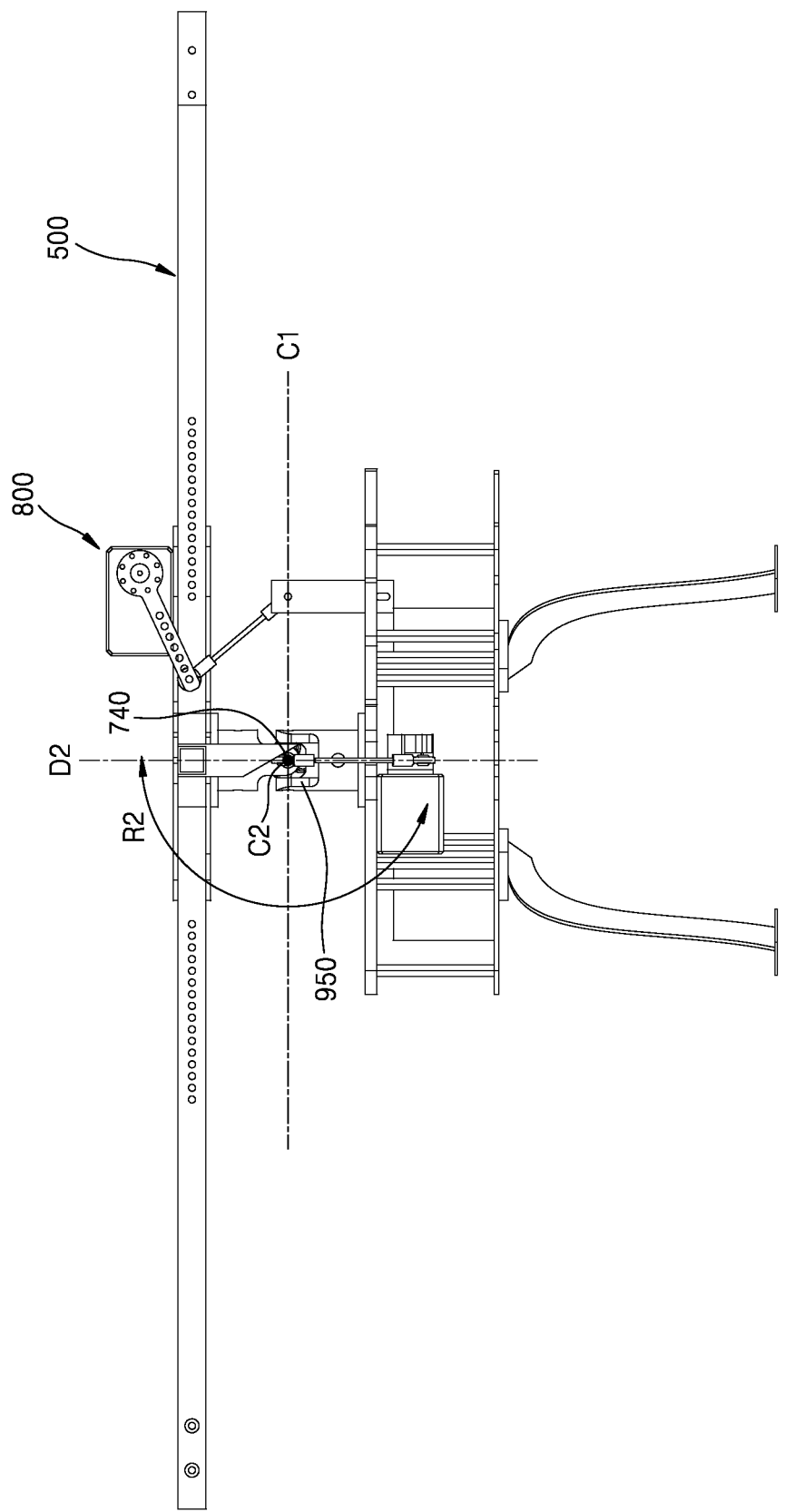
Figure 13:
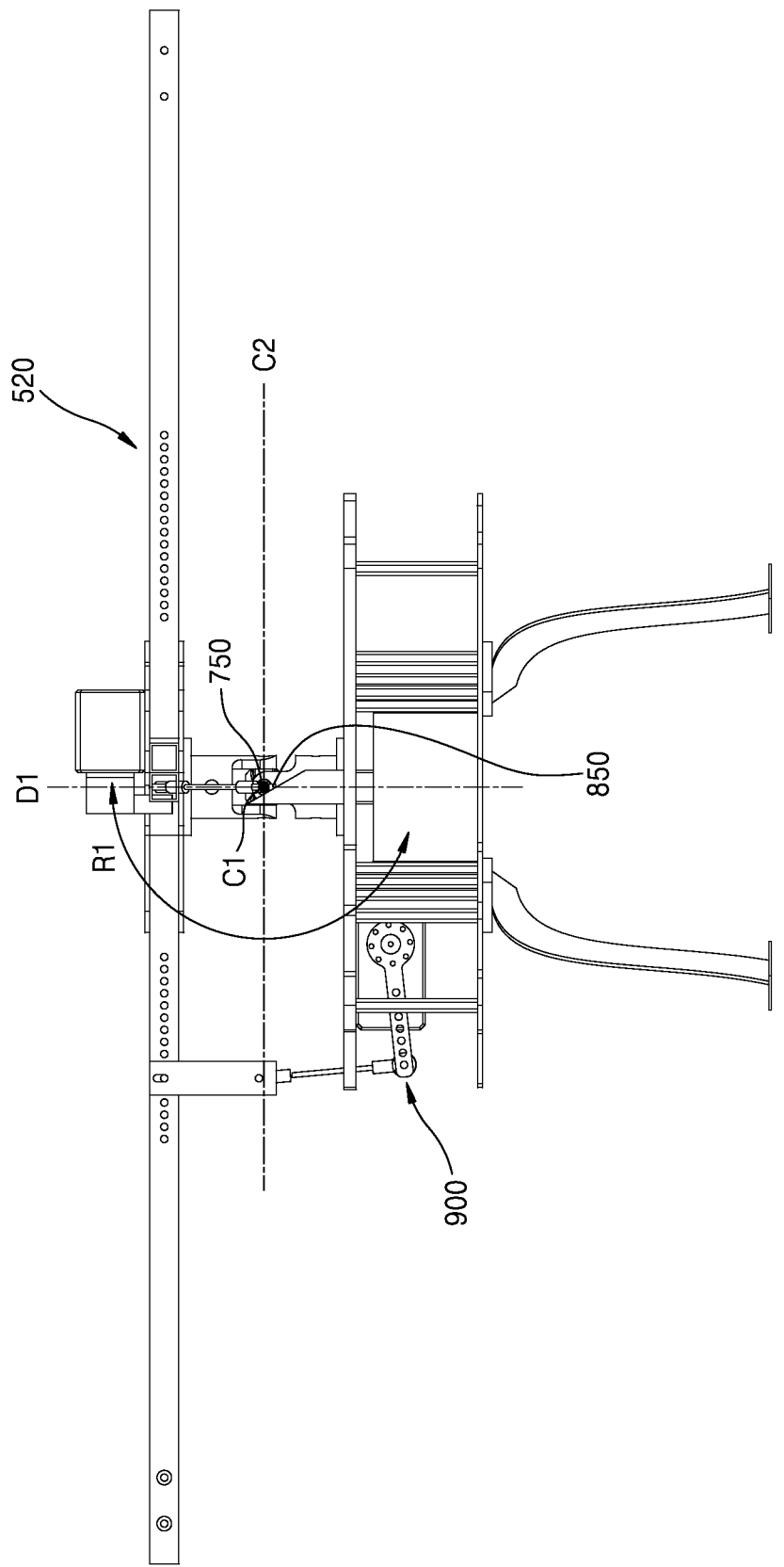

FIGS. 11 to 13 are views showing an operation and posture control of a flight vehicle according to the present disclosure. As shown in FIG. 12, when the first variable link module 800 operates, the thrust module 500 performs a pitch motion with respect to the pitch axis C2 as indicated by an arrow R2. In addition, as shown in FIG. 13, when the second variable link module 900 operates, the thrust module 500 performs a roll motion with respect to the roll axis C1 as indicated by an arrow R1.

The flight vehicle according to the second embodiment of the present disclosure includes the first connection member P. Therefore, the first pivot joint 850 connecting the first variable link module 800 to the first connection member P is always positioned on the same line as the roll axis C1 of the thrust module 500.

In addition, because the flight vehicle according to the second embodiment of the present disclosure includes the second connection member Q, the second pivoting joint 950 connecting the second variable link module 900 to the second connection member is always on the same line as the pitch axis C2 of the thrust module 500.

According to this, it may be understood that a virtual arm is provided between the first connection shaft 740 provided in the joint module 700 and the first pivoting joint 850. In addition, it may be understood that a virtual arm is similarly provided between the second connection shaft 750 provided in the joint module 700 and the second pivoting joint 950. The virtual arms function as the roll axis C1 and the pitch axis C2 of the thrust module 500.

In addition, the first pivoting joint 850 connecting the first connection member P to the first variable link module 800, and the second pivoting joint 950 connecting the second connection member Q to the second variable link module 900 are each configured as a ball joint. Therefore, the pivoting of the thrust module 500 with respect to the roll axis C1 and the pivoting of the thrust module 500 with respect to the pitch axis C2 may be performed freely and independently without affecting each other.

In summary, the roll motion of the thrust module 500 does not affect the pitch axis C2 of the thrust module 500. Therefore, the thrust module 500 may control a roll posture irrespective of a pitch posture. The same is true for the pitch motion of the thrust module 500. The pitch motion of the thrust module 500 does not affect the roll axis C1 of the thrust module 500. Therefore, the first variable link module 800 that performs the roll motion of the thrust module 500 may control the roll posture regardless of the pitch posture of the thrust module 500. In addition, the second variable link module 900 that performs the pitch motion of the thrust module 500 may control the pitch posture regardless of the roll posture of the thrust module 500. That is, since the pitch motion and the roll motion of the thrust module 500 are performed independently from each other, the posture control and the motion control of the thrust module 500 may be easily performed.

For example, it is assumed that without the first connection member P and the second connection member Q, the first variable link module 800 is directly connected to the first arm 510, and the second variable link module 900 is directly connected to the second arm 520. In this case, the connection position of the first variable link module 800 and the first arm 510 and the connection position of the second variable link module 900 and the second arm 520 are respectively positions different from the roll axis C1 and the pitch axis C2 of the thrust module 500. Thus, the roll motion and pitch motion of the thrust module 500 affect each other.

According to the present disclosure, the main module 600, which is in charge of cargo transportation, photographing or various missions, may have a posture independent of the thrust module 500, and the thrust module 500 in charge of the thrust may perform the roll and pitch motions. That is, the thrust module 500 may perform the roll and pitch motions relative to the main module 600 to freely control a flight direction.

In addition, in the flight vehicle according to the second embodiment of the present disclosure, since the roll motion and the pitch motion of the thrust module 500 may be performed independently from each other, the posture control and the motion control of the entire flight vehicle may be accurately and simply performed.

Although the preferred embodiments have been illustrated and described above, the present disclosure is not limited to the specific embodiments described above, and does not depart from the gist of the present disclosure as claimed in the claims. Various modifications may be made by one of ordinary skill in the art, and these modifications should not be individually understood from the technical spirit or the prospect of the present disclosure.

The invention claimed is:

1. A flight vehicle comprising:
a thrust module configured to generate thrust for flight of the flight vehicle;
a main module located below the thrust module;
a joint module configured to connect the thrust module to the main module up and down; and
a link module configured to connect the thrust module to the main module,
wherein the joint module is configured to connect the thrust module to the main module in order to enable the thrust module to relatively perform a roll motion and a pitch motion with respect to the main module such that the thrust module enables to perform the roll motion and the pitch motion independently from a posture of the main module,
wherein the joint module comprises:
an upper joint member pivotable with respect to a first pivoting shaft extending in a horizontal direction;
a lower joint member pivotable with respect to a second pivoting shaft orthogonal to the first pivoting shaft and extending in the horizontal direction; and
a connection block disposed between the upper joint member and the lower joint member and to which the first pivoting shaft and the second pivoting shaft are connected,
wherein the thrust module comprises one or more arms extending in a horizontal direction,
wherein the link module is configured to vary a distance between one side of the thrust module and the main module to enable the thrust module to relatively perform a roll motion and a pitch motion,
wherein the link module comprises:
a rod unit configured to connect between one side of the arm and the main module;
a driving unit fixed to the main module and configured to vary a height of the rod unit in an up and down direction; and
a link unit configured to connect between the rod unit and the driving unit,
wherein one end of the link unit is pivotally connected to the driving unit, and the other end is pivotally connected to the rod unit, and,
according to an operation of the driving unit, the link unit pivots to move the rod unit up and down.

2. The flight vehicle of claim 1, wherein the upper joint member and the lower joint member are arranged in series in an up and down direction.

3. The flight vehicle of claim 1, wherein the joint module comprises a universal joint.

4. The flight vehicle of claim 1, wherein the one or more arms comprise a first arm and a second arm intersecting perpendicularly to each other,
wherein the link module comprises a first link module and a second link module, and
wherein the first link module pivots the first arm with respect to the first pivoting shaft, and the second link module pivots the second arm with respect to the second pivoting shaft.

5. The flight vehicle of claim 1, wherein an end of the rod unit and the one or more arms are connected by a rod-end having a ball joint.

* * * * *